Sept. 15, 1970
E. G. ZOERB
3,528,298
FLUIDIC SENSING APPARATUS
Filed May 4, 1967
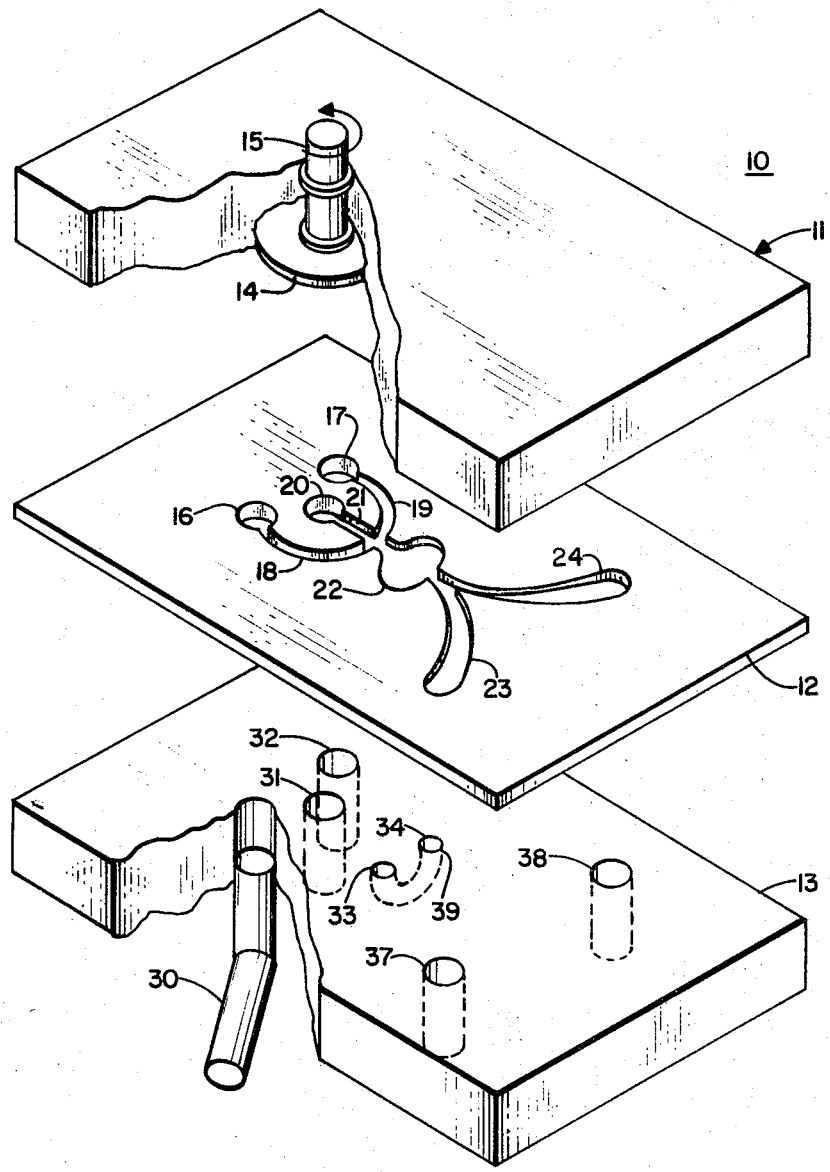
INVENTOR.
EDWARD G. ZOERB
BY
*Carl L. Johnson*
ATTORNEY United States Patent Office 3,528,298
Patented Sept. 15, 1970

3,528,298
FLUIDIC SENSING APPARATUS
Edward G. Zoerb, Roseville, Minn., assignor to Honeywell Inc., Minneapolis, Minn., a corporation of Delaware
Filed May 4, 1967, Ser. No. 636,044
Int. Cl. G01p $3/34$
U.S. Cl. 73—521                    6 Claims

ABSTRACT OF THE DISCLOSURE

Apparatus for providing a fluid signal indicative of the direction and velocity of a moving member comprising a fluid amplifier having the moving member in communication with its control region so that viscous coupling is achieved. A fluid stream within the amplifier is, thus deflected in accordance with the movement of said member.

---

The invention herein described was made in the course of or under a contract or subcontract thereunder with the Department of the Air Force.

BACKGROUND OF THE INVENTION

This invention relates generally to speed sensing devices, and more specifically, to a speed sensor readily adaptable for use with fluidic control systems.

Sensors are known in the prior art which sense the angular velocity of a rotating curved surface by means of a pressure probe placed adjacent to the curved surface. An example of such a device is shown in the Milmore Pat. No. 2,660,886.

SUMMARY OF THE INVENTION

Briefly, the present invention employs a rotating flat surface adjacent to the control region of a fluid amplifier to generate an output signal indicative of the angular velocity of said rotating flat surface. By placing said rotating flat surface adjacent to the control region of a fluid amplifier the speed sensor can become an integral part of a fluid amplifier system, thus reducing the size of the system. Also, the speed sensor can be easily matched with other fluid amplifiers since the sensor itself comprises a portion of the fluid amplifier.

BRIEF DESCRIPTION OF THE DRAWING

The single figure shows an exploded pictorial view of my speed sensor device.

DESCRIPTION OF THE PREFERRED EMBODIMENT

Referring to the figure, reference numeral 10 generally indicates my speed sensing device. Speed sensor 10 comprises a top housing 11, a middle plate 12, and a bottom housing 13. Located in the top housing 11 is a rotatable shaft 15 having at one end a flat surface 14 whose angular velocity is to be sensed. Flat surface 14 is located adjacent to plate 12 and directly over the control region of a fluid amplifier formed when the plate and housings are assembled.

Formed in the plate 12 are fluid amplifier passages including an inlet 16, an inlet 17, a control passage 18, a control passage 19, a fluid inlet 20, a fluid power nozzle 21, an interaction region 22, an outlet leg 23 and an outlet leg 24. The passages shown in plate 12 provide a proportional fluid amplifier with housings 11 and 13 defining the upper and lower surfaces respectively. Located in housing 13 is a fluid supply passage 30 which supplies fluid to the inlet 16, a fluid supply passage 31 which supplies fluid to inlet 20 and a fluid supply passage 32 which supplies fluid to inlet 17. Also shown are two vents 33 and 34 which connect opposite sides of interaction chamber 22 to one another through a chamber 39 to equalize the pressures on both sides of a fluid stream issuing from power nozzle 21. (It is known that this type of venting arrangement causes an amplifier to operate as a proportional device.)

The output signals from the fluid amplifier are fed from outlet leg 23 into a passage 37 in housing 13. Likewise the output signals from outlet leg 24 are fed into an outlet passage 38 in housing 13.

In the operation of my rotating disc speed sensor, a fluid is supplied through passages 30, 31, and 32 to inlets 16, 20, and 17 respectively. When shaft 15 is not rotating, fluid flows equally from inlets 16 and 17 into the interaction region 22 through control passages 18 and 19. The equal flows in control passages 18 and 19 oppose and nullify one another when they arrive in interaction region 22. Consequently, the fluid stream issuing from power nozzle 21 divides equally between outlet legs 23 and 24, creating a zero differential signal at outlet passages 37 and 38. When the shaft 15 rotates in a counter-clockwise manner as illustrated in the drawing, fluid is pumped or dragged, due to viscous action, from inlet 16 into interaction region 22 through curved passage 18, and fluid is impeded as it flows from inlet 17 to interaction region 22 through curved passage 19. This occurs because the viscous properties of the fluid cause the fluid adjacent to the rotating surface to move along with the rotating surface. Hence, because of the arrangement of the shaft with respect to the fluid amplifier, fluid is aided in its flow in one passage while impeded in its flow in the other passage. As a consequence, more of the fluid stream issuing from fluid power nozzle 21 is deflected into outlet leg 24 than into outlet leg 23.

It will be apparent, if the shaft rotates in the opposite direction (clockwise), the results will be exactly opposite. Namely, the fluid is aided in its flow in passage 19 and impeded in its flow in passage 18. Hence, a differential fluid signal would exist across control ports 18 and 19 tending to deflect the stream emanating from power nozzle 21 into outlet leg 23. As the angular velocity of the shaft increases or decreases the amount of fluid dragged into and away from the interaction region 22 varies in proportion to the angular velocity of the shaft, and the amount of fluid flowing to passages 37 and 38 varies accordingly. The output of the device may be taken as the differential pressure in passages 37 and 38 which, as shown, is indicative of the velocity of the shaft 15. Although the rotating shaft is shown, other movements of a member past the central region would also produce an output signal indicative of the motion of the member. For example, if the shaft is caused to oscillate, an oscillating output would be produced by the fluid amplifier. It will further be apparent that the shape of the member need not be round if the member is oscillating. For example, a rectangular member may be employed adjacent to the control region of the fluid amplifier.

It can thus be seen that I have built a compact speed sensing unit in which the rotating shaft, whose speed is to be sensed, forms an integral part of my system. It can also be seen that my device provides an output signal indicative of the rotation of the shaft as well as the direction of rotation.

The embodiments of the invention in which an exclusive property or right is claimed are defined as follows:
What is claimed is:
1. Apparatus of the class described comprising:
   a housing defining a fluid supply passage for issuing a fluid stream along an axis and outlet means including a pair of receiver ports spaced from said supply passage on opposite sides of said axis for receiving said fluid stream, said axis and said receiver ports lying substantially in a plane; and a member having a planar surface thereon parallel to said plane and tangent to said fluid stream, said member adapted for motion relative to said housing so that said planar surface is moveable transverse to said fluid stream at a location between said supply passage and said receiver ports, whereby motion of said member results in deflection of said fluid stream due to viscous action between said planar surface and said stream, thereby varying the portions of said stream received by said receiver ports.

2. The apparatus of claim 1 wherein said member comprises a shaft rotatably mounted relative to said housing and said planar surface comprises an end surface of said shaft.

3. The apparatus of claim 1 wherein said housing further defines passage means for supplying control fluid adjacent to said planar surface for viscous coupling therewith, variable motion of said planar surface resulting in variable transverse impingement of said control fluid on said fluid stream.

4. The apparatus of claim 3 wherein said passage means comprises a pair of opposingly oriented control passages transversely disposed on opposite sides of said axis between said supply passage and said receiver ports.

5. The apparatus of claim 4 wherein said pair of control passages is symmetrical with respect to said axis; and wherein is further included fluid supply means for supplying fluid at equal pressures to each of said pair of control passages to produce equal flows of fluid therethrough, motion of said member aiding the flow of fluid in one of said pair of control passages and impeding the flow of fluid in the other of said pair of control passages, thereby resulting deflection of said fluid stream as a function of the motion of said member.

6. The apparatus of claim 1 wherein said housing is configured so that the portions of said fluid stream received by said receiver ports vary proportionally with variations in motion of said member.

References Cited

UNITED STATES PATENTS 3,311,987   4/1967   Blazek.

JAMES J. GILL, Primary Examiner